(12) United States Patent
Tuttle (10) Patent No.: US 12,033,021 B2
(45) Date of Patent: Jul. 9, 2024

(54) SYSTEMS AND METHODS TO DETERMINE MOTION PARAMETERS USING RFID TAGS

(71) Applicant: Micron Technology, Inc., Boise, ID (US)

(72) Inventor: John R. Tuttle, Longmont, CO (US)

(73) Assignee: Micron Technology, Inc., Boise, ID (US)

(*) Notice: Subject to any disclaimer, the term of this patent is extended or adjusted under 35 U.S.C. 154(b) by 192 days.

(21) Appl. No.: 17/319,000

(22) Filed: May 12, 2021

(65) Prior Publication Data

US 2021/0264121 A1    Aug. 26, 2021

Related U.S. Application Data

(63) Continuation of application No. 16/846,629, filed on Apr. 13, 2020, now Pat. No. 11,042,720, which is a continuation of application No. 16/405,946, filed on May 7, 2019, now Pat. No. 10,650,200, which is a continuation of application No. 15/295,103, filed on Oct. 17, 2016, now Pat. No. 10,438,031, which is a continuation of application No. 14/132,482, filed on Dec. 18, 2013, now Pat. No. 9,477,863, which is a
(Continued)

(51) Int. Cl.
*G06K 7/10* (2006.01)
*G01S 11/10* (2006.01)
*G01S 13/75* (2006.01)
*G06K 7/00* (2006.01)

(52) U.S. Cl.
CPC .......... *G06K 7/10316* (2013.01); *G01S 11/10* (2013.01); *G01S 13/756* (2013.01); *G06K 7/0008* (2013.01); *G06K 7/10019* (2013.01); *G06K 7/10366* (2013.01); *H04Q 2213/13095* (2013.01)

(58) Field of Classification Search
CPC ............. G06K 7/10316; G06K 7/0008; G06K 7/10019; G06K 7/10366; G01S 11/10; G01S 13/756; H04Q 2213/13095
USPC ...................................... 340/5.64, 10.1–10.5
See application file for complete search history.

(56) References Cited

U.S. PATENT DOCUMENTS 3,896,436 A * 7/1975 Johnson ................ G01S 13/449
 342/194
4,016,568 A   4/1977 Makimoto et al.
(Continued)

FOREIGN PATENT DOCUMENTS

KR   20060112976   11/2006
KR   20070021913   2/2007
WO   2007047226    4/2007

OTHER PUBLICATIONS

Georgia State University, "Police Radar," located at http://hyperphysics.phy-astr.gsu.edu/hbase/sound/radar.html, Jul. 1, 2003.
(Continued)

*Primary Examiner* — Nam V Nguyen
(74) *Attorney, Agent, or Firm* — Greenberg Traurig (57) ABSTRACT

Systems and methods to determine motion parameters of physical objects using radio frequency identification (RFID) tags attached to the objects. In one embodiment, a method implemented in a radio frequency identification (RFID) system includes determining a motion parameter of the RFID tag based on detecting a Doppler frequency shift in a radio frequency signal received from the RFID tag.

19 Claims, 5 Drawing Sheets

Related U.S. Application Data continuation of application No. 13/533,890, filed on Jun. 26, 2012, now Pat. No. 8,633,805, which is a continuation of application No. 12/134,103, filed on Jun. 5, 2008, now Pat. No. 8,242,888.

(56) References Cited

U.S. PATENT DOCUMENTS

| | | | |
|---|---|---|---|
| 4,075,632 A | 2/1978 | Baldwin et al. | |
| 4,804,961 A | 2/1989 | Hane | |
| 5,796,362 A | 8/1998 | Ayasli et al. | |
| 5,900,834 A | 5/1999 | Kubinec | |
| 5,952,922 A | 9/1999 | Shober | |
| 6,046,683 A | 4/2000 | Pidwerbetsky et al. | |
| 6,084,530 A | 7/2000 | Pidwerbetsky et al. | |
| 6,184,831 B1 | 2/2001 | Dalby et al. | |
| 6,369,710 B1* | 4/2002 | Poticny | G08B 21/086 340/572.1 |
| 6,424,916 B2 | 7/2002 | Nysen | |
| 6,456,191 B1 | 9/2002 | Federman | |
| 6,600,418 B2 | 7/2003 | Francis et al. | |
| 6,674,403 B2 | 1/2004 | Gray et al. | |
| 6,717,516 B2 | 4/2004 | Bridgelall | |
| 6,812,824 B1* | 11/2004 | Goldinger | G06Q 30/06 340/8.1 |
| 6,909,397 B1* | 6/2005 | Greneker, III | G01S 13/862 342/28 |
| 6,920,330 B2 | 7/2005 | Caronni et al. | |
| 7,045,996 B2 | 5/2006 | Lyon et al. | |
| 7,049,965 B2 | 5/2006 | Kelliher et al. | |
| 7,091,863 B2 | 8/2006 | Ravet | |
| 7,119,687 B2 | 10/2006 | Paulsen et al. | |
| 7,142,120 B2 | 11/2006 | Charych et al. | |
| 7,147,246 B2 | 12/2006 | Breed et al. | |
| 7,156,312 B2 | 1/2007 | Becker et al. | |
| 7,170,412 B2 | 1/2007 | Knox et al. | |
| 7,215,976 B2 | 5/2007 | Brideglall | |
| 7,308,202 B2 | 12/2007 | Roes et al. | |
| 7,310,045 B2 | 12/2007 | Inui | |
| 7,378,967 B2 | 5/2008 | Sullivan et al. | |
| 7,388,501 B2 | 6/2008 | Tang et al. | |
| 7,403,120 B2 | 7/2008 | Duron et al. | |
| 7,453,363 B2 | 11/2008 | Reynolds | |
| 7,504,952 B2 | 3/2009 | Kaplan et al. | |
| 7,511,604 B2 | 3/2009 | Raphaeli et al. | |
| 7,561,048 B2 | 7/2009 | Yushkov et al. | |
| 7,580,378 B2 | 8/2009 | Carrender et al. | |
| 7,609,163 B2 | 10/2009 | Shafer | |
| 7,653,483 B2* | 1/2010 | Schmidt | G05D 1/028 340/988 |
| 7,689,195 B2 | 3/2010 | Wu et al. | |
| 7,907,056 B2 | 3/2011 | Shimizu | |
| 7,924,160 B1 | 4/2011 | LaPenta et al. | |
| 8,045,654 B1 | 10/2011 | Anderson | |
| 8,242,888 B2 | 8/2012 | Tuttle | |
| 8,294,554 B2 | 10/2012 | Shoarinejad et al. | |
| 8,461,966 B2 | 6/2013 | Tuttle | |
| 8,633,805 B2 | 1/2014 | Tuttle | |
| 8,830,062 B2 | 9/2014 | Tuttle | |
| 9,030,301 B2 | 5/2015 | Tuttle | |
| 9,477,863 B2 | 10/2016 | Tuttle | |
| 9,690,961 B2 | 6/2017 | Tuttle | |
| 10,162,992 B2 | 12/2018 | Tuttle | |
| 10,438,031 B2 | 10/2019 | Tuttle | |
| 10,571,558 B2 | 2/2020 | Tuttle | |
| 10,592,711 B2 | 3/2020 | Tuttle | |
| 10,650,200 B2 | 5/2020 | Tuttle | |
| 10,824,829 B2 | 11/2020 | Tuttle | |
| 11,042,720 B2 | 6/2021 | Tuttle | |
| 11,237,262 B2 | 2/2022 | Tuttle | |
| 11,403,473 B2* | 8/2022 | Tuttle | G06K 7/10009 |
| 2002/0019702 A1 | 2/2002 | Nysen | |
| 2002/0149480 A1 | 10/2002 | Shanks et al. | |
| 2003/0147651 A1 | 8/2003 | Roes et al. | |
| 2004/0178944 A1 | 9/2004 | Richardson et al. | |
| 2004/0217865 A1 | 11/2004 | Turner | |
| 2005/0012653 A1 | 1/2005 | Heide et al. | |
| 2005/0040994 A1 | 2/2005 | Mazoki et al. | |
| 2005/0052287 A1 | 3/2005 | Whitesmith et al. | |
| 2005/0226518 A1 | 10/2005 | Suzuki et al. | |
| 2005/0237159 A1 | 10/2005 | Cooper et al. | |
| 2005/0237953 A1 | 10/2005 | Carrender et al. | |
| 2005/0253725 A1 | 11/2005 | Neuwirth et al. | |
| 2005/0258937 A1 | 11/2005 | Neuwirth | |
| 2005/0280539 A1 | 12/2005 | Pettus | |
| 2006/0001525 A1 | 1/2006 | Nitzan et al. | |
| 2006/0038676 A1 | 2/2006 | Richards | |
| 2006/0043199 A1 | 3/2006 | Baba et al. | |
| 2006/0220794 A1 | 10/2006 | Zhu | |
| 2006/0238301 A1 | 10/2006 | Wu et al. | |
| 2006/0244580 A1 | 11/2006 | Nordmeyer | |
| 2006/0273905 A1 | 12/2006 | Choi et al. | |
| 2006/0284727 A1* | 12/2006 | Steinke | G06K 19/0723 342/127 |
| 2007/0001814 A1 | 1/2007 | Steinke et al. | |
| 2007/0030151 A1 | 2/2007 | Morrow | |
| 2007/0037582 A1 | 2/2007 | Mohi et al. | |
| 2007/0109099 A1 | 5/2007 | Raphaeli et al. | |
| 2007/0139200 A1 | 6/2007 | Yushkov et al. | |
| 2007/0149216 A1 | 6/2007 | Misikangas | |
| 2007/0152831 A1 | 7/2007 | Eisele | |
| 2007/0152833 A1 | 7/2007 | Kaplan et al. | |
| 2007/0182578 A1 | 8/2007 | Smith | |
| 2007/0247311 A1 | 10/2007 | Muchkaev | |
| 2007/0268140 A1 | 11/2007 | Tang et al. | |
| 2007/0279192 A1 | 12/2007 | Tanaka | |
| 2007/0279225 A1 | 12/2007 | Pellerano et al. | |
| 2008/0012712 A1 | 1/2008 | Shimizu | |
| 2008/0021651 A1 | 1/2008 | Seeley et al. | |
| 2008/0061976 A1 | 3/2008 | Shafer | |
| 2008/0136644 A1 | 6/2008 | Mccorkle | |
| 2008/0180218 A1 | 7/2008 | Flax | |
| 2008/0197982 A1 | 8/2008 | Sadr | |
| 2008/0204322 A1* | 8/2008 | Oswald | G01S 5/04 342/465 |
| 2008/0231424 A1 | 9/2008 | Arnitz | |
| 2008/0238685 A1 | 10/2008 | Tuttle | |
| 2008/0238686 A1 | 10/2008 | Tuttle | |
| 2008/0252293 A1 | 10/2008 | Lagae et al. | |
| 2008/0252422 A1 | 10/2008 | Dowla et al. | |
| 2008/0280560 A1 | 11/2008 | Tuttle | |
| 2008/0318682 A1 | 12/2008 | Rofougaran et al. | |
| 2008/0318683 A1 | 12/2008 | Rofougaran et al. | |
| 2009/0091428 A1 | 4/2009 | Tuttle | |
| 2009/0091454 A1 | 4/2009 | Tuttle | |
| 2009/0303004 A1 | 12/2009 | Tuttle | |
| 2009/0303005 A1 | 12/2009 | Tuttle | |
| 2009/0303007 A1 | 12/2009 | Ryou et al. | |
| 2010/0123558 A1 | 5/2010 | Park et al. | |
| 2010/0253481 A1 | 10/2010 | Zand | |
| 2012/0268253 A1 | 10/2012 | Tuttle | |
| 2012/0268308 A1 | 10/2012 | Tuttle | |
| 2013/0241708 A1 | 9/2013 | Tuttle | |
| 2014/0104042 A1 | 4/2014 | Tuttle | |
| 2015/0227770 A1 | 8/2015 | Tuttle | |
| 2016/0363662 A1 | 12/2016 | Tuttle | |
| 2017/0032157 A1 | 2/2017 | Tuttle | |
| 2017/0262669 A1 | 9/2017 | Tuttle | |
| 2019/0095661 A1 | 3/2019 | Tuttle | |
| 2019/0257937 A1 | 8/2019 | Tuttle | |
| 2019/0266366 A1 | 8/2019 | Tuttle | |
| 2020/0167532 A1 | 5/2020 | Tuttle | |
| 2020/0242312 A1 | 7/2020 | Tuttle | |
| 2021/0034827 A1 | 2/2021 | Tuttle | |
| 2022/0120889 A1 | 4/2022 | Tuttle | |

OTHER PUBLICATIONS

International Application No. PCT/US08/54901, International Search Report and Written Opinion, dated Jul. 28, 2008.
International Application No. PCT/US08/55537, International Search Report and Written Opinion, dated Jul. 30, 2008.

(56) References Cited

OTHER PUBLICATIONS

International Application No. PCT/US08/56247, International Search Report and Written Opinion, dated Aug. 14, 2008.
Page, Raymond, "A Low Power RFID Transponder," RF Design, pp. 31-32, 34, 36, Jul. 1993.
Trolley Scan (Pty) Ltd., RFID-radar Newsletters No. 1-No. 12, Oct. 2005-Jan. 2007.
Systems and Methods to Determine Motion Parameters Usign RFID Tags U.S. Appl. No. 12/134,103, filed Jun. 5, 2008 John Tuttle Patented Case Sep. 19, 2011.
Systems and Methods to Determine Motion Parameters Using RFID Tags U.S. Appl. No. 13/533,890, filed Jun. 26, 2012 John Tuttle Patented Case Jun. 7, 2013.
Systems and Methods to Determine Motion Parameters Using RFID Tags U.S. Appl. No. 14/132,482, filed Dec. 18, 2013 John Tuttle Patented Case Mar. 11, 2016.
Systems and Methods to Determine Motion Parameters Using RFID Tags U.S. Appl. No. 15/295,103, filed Oct. 17, 2016 John Tuttle Patented Case Apr. 8, 2019.
Systems and Methods to Determine Motion Parameters Using RFID Tags U.S. Appl. No. 16/405,946, filed May 7, 2019 John Tuttle Patented Case Sep. 25, 2019.
Systems and Methods to Determine Motion Parameters Using RFID Tags U.S. Appl. No. 16/846,629, filed Apr. 13, 2020 John Tuttle Notice of Allowance Mailed—Application Received in Office of Publications dated Nov. 13, 2020.
Systems and Methods to Use Radar in RFID Systems U.S. Appl. No. 12/134,106, filed Jun. 5, 2008 John Tuttle Patented Case Jan. 30, 2014.
Systems and Methods to Use Radar in RFID Systems U.S. Appl. No. 14/454,546, filed Aug. 7, 2014 John Tuttle Patented Case Jul. 1, 2019.
Systems and Methofd to Use Radar in RFID Systems U.S. Appl. No. 16/398,096, filed Apr. 29, 2019 John Tuttle Non Final Action dated Apr. 9, 2021.
Systems and Methods to Determine Kinematical Parameters using RFID Tags U.S. Appl. No. 12/134,107, filed Jun. 5, 2008 John Tuttle Patented Case Aug. 23, 2012.
Systems and Methods to Determine Kinematical Parameters using RFID Tags U.S. Appl. No. 13/891,101, filed May 9, 2012 John Tuttle Patented Case Sep. 12, 2014.
Systems and Methods to Determine Kinematical Parameters using RFID Tags U.S. Appl. No. 14/696,247, filed Apr. 24, 2015 John Tuttle Patented Case Oct. 11, 2016.
Systems and Methods to Determine Kinematical Parameters using RFID Tags U.S. Appl. No. 15/598,199, filed May 17, 2017 John Tuttle Patented Case Jan. 16, 2018.
Systems and Methods to Determine Kinematical Parameters U.S. Appl. No. 16/201,704, filed Nov. 27, 2018 John Tuttle Patented Case Jul. 11, 2019.
Systems and Methods to Determine Kinematical Parameters U.S. Appl. No. 16/778,727, filed Jan. 31, 2020 John Tuttle Patented Case Mar. 6, 2020.
Systems and Methods to Determine Kinematical Parameters U.S. Appl. No. 17/073,797, filed Oct. 19, 2020 John Tuttle Application Dispatched from Preexam, Not Yet Docketed Oct. 26, 2020.
Preexam, Not Yet Docketed.
International Application No. PCT/US08/56247, Written Opinion, dated Aug. 14, 2008.

* cited by examiner

SYSTEMS AND METHODS TO DETERMINE MOTION PARAMETERS USING RFID TAGS

RELATED APPLICATIONS

The present application is a continuation application of U.S. patent application Ser. No. 16/846,629, filed Apr. 13, 2020, issued as U.S. Pat. No. 11,042,720 on Jun. 22, 2021, which is a continuation application of U.S. patent application Ser. No. 16/405,946, filed May 7, 2019 and issued as U.S. Pat. No. 10,650,200 on May 12, 2020, which is a continuation application of U.S. patent application Ser. No. 15/295,103, filed Oct. 17, 2016 and issued as U.S. Pat. No. 10,438,031 on Oct. 8, 2019, which is a continuation application of U.S. patent application Ser. No. 14/132,482, filed Dec. 18, 2013 and issued as U.S. Pat. No. 9,477,863 on Dec. 25, 2016, which is a continuation application of U.S. patent application Ser. No. 13/533,890, filed Jun. 26, 2012 and issued as U.S. Pat. No. 8,633,805 on Jan. 21, 2014, which is a continuation application of U.S. patent application Ser. No. 12/134,103, filed Jun. 5, 2008 and issued as U.S. Pat. No. 8,242,888 on Aug. 14, 2012, the entire disclosures of which applications are hereby incorporated herein by reference.

FIELD OF THE TECHNOLOGY

At least some embodiments disclosed herein relate to determining motion parameters of physical objects, such as position, speed or acceleration, using a radio frequency identification (RFID) system.

BACKGROUND

A typical radio frequency identification (RFID) tag has a memory configured to store data, such as data that uniquely identifies the tag among a plurality of RFID tags. An RFID reader can be used to communicate with RFID tags over a radio link. Thus, the identity of the tag and the object labeled by the tag can be determined by the RFID reader in an automated process.

In a typical RFID system, an RFID reader is configured to interrogate the tags via radio frequency electromagnetic waves. The RFID reader broadcasts commands using a beam of electromagnetic wave. In response to the interrogation signals from the RFID reader, an RFID tag can be selected to produce a radio frequency response signal.

An RFID tag may be passive, semi-passive or active, depending on the power source of the RFID tag and how the response from the RFID is generated.

A passive RFID tag does not have an internal battery or power source. A passive RFID tag operates using the power drawn from the interrogating electromagnetic wave. A passive RFID tag provides responses through modulating the interrogating electromagnetic wave backscattered by the tag.

A semi-active RFID tag operates using the power drawn from its internal battery or power source. A semi-active RFID tag provides responses through modulating the interrogating electromagnetic wave backscattered by the tag.

An active tag that has an internal battery or power source, using which a separate transmission signal is generated to provide the response. The response signal is generated independent from the interrogating electromagnetic wave.

Radio frequency identification (RFID) tags are used in a variety of applications, such as tagging vehicles on toll roads, tagging shipping containers, quality control on assembly line conveyor belts, and monitoring tactical military equipment maneuvers, etc.

Doppler effect is the change in the observed frequency of a wave, as perceived by an observer, when the source of the wave is moving relative to the observer. The frequency observed by the observer increases if the source of the wave moves towards the observer; and the observed frequency decreases if the source of the wave moves away from the observer. The Doppler effect has been used in some forms of radar to measure the velocity of objects.

In a classical example of a stationary observer listening to the whistle of a train moving relative to the listener, the pitch (frequency) of the whistle as perceived by the listener is higher as the train is approaching; and the pitch (frequency) of the whistle appears lower as the train is receding. In such a classical example, the source of the wave frequency is generated at the moving object (e.g., train).

SUMMARY OF THE DESCRIPTION

Systems and methods to determine motion parameters of physical objects using radio frequency identification (RFID) tags attached to the objects are described herein. Some embodiments are summarized in this section.

In one embodiment, a method implemented in a radio frequency identification (RFID) system includes determining a motion parameter of the RFID tag based on detecting a Doppler frequency shift in a radio frequency signal received from the RFID tag.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment of the disclosure provides a process implemented in a radio frequency identification system to monitor the motion of physical objects tagged by RFID tags. In one embodiment, Doppler effect in a radio frequency signal received from a RFID tag is detected to determine a motion parameter of the RFID tag, such as the position, speed, acceleration, jerk, etc. The radio frequency signal may be generated via reflecting an interrogating electromagnetic wave transmitted from an RFID reader, or via an independent oscillator of the RFID tag. In one embodiment, Doppler is determined using substantially the RFID equipment.

In one embodiment, an RFID reader sends a command to an RFID tag to start a communication session, which can be used for the determination of Doppler. For example, the RFID tag may be selected to reflect the electromagnetic wave transmitted by the RFID reader to generate a backscattered electromagnetic wave; and the total Doppler shift in the backscattered electromagnetic wave can be detected to determine a motion speed of the RFID tag. In another embodiment, an active RFID tag may transmit a separate electromagnetic wave which can be received by a plurality of antennas to detect the Doppler effect.

In one embodiment, the tag reflects the interrogating electromagnetic wave, or transmits the separate electromagnetic wave, without modulating data on the wave transmitted from the RFID. In another embodiment, the data modulated on the wave transmitted from the RFID is removed (e.g., through demodulation or normalization) to detect the total Doppler frequency shift.

For example, an antenna feed signal can be generated and used by an RFID reader to send an interrogating electromagnetic wave to radio frequency devices, such as an RFID tag. A backscattered electromagnetic wave is received from the RFID tag to create a received signal. The antenna feed signal and the received signal can be compared to detect Doppler effects.

For example, a combined signal can be generated or calculated from the antenna feed signal and the received signal. A frequency of the combined signal can be determined to compute the relative speed between the radio frequency device and the reading antenna. Alternatively, the frequency of the antenna feed signal and the frequency of the received signal can be separately determined to compute the frequency shift.

Figure 1:
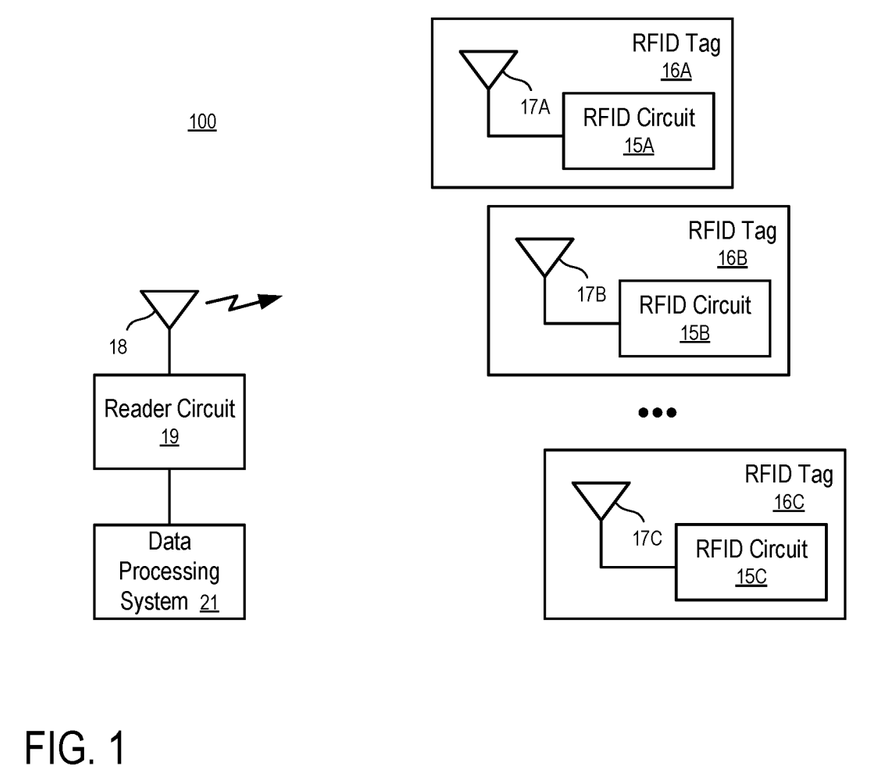
FIG. 1 shows a radio frequency identification (RFID) system according to one embodiment.

FIG. 1 shows a radio frequency identification (RFID) system according to one embodiment. In FIG. 1, the system (100) includes a data processing system (21) coupled to an RFID reader circuit (19). The data processing system (21) may include a general purpose computer, or a special purpose computer, or a set of computers coupled to the reader circuit (19) via a data communication network, such as a local area network, Internet, etc. The data processing system (21) can be used to perform at least part of the computations to determine the motion parameters, such as position, speed, acceleration, jerk, based on detected Doppler.

The reader circuit (19), or a combination of the reader circuit (19) and the data processing system (21), may also be referred to as an interrogator or reader.

In FIG. 1, the reader circuit (19) communicates with one or more RFID tags (e.g., 16A, 16B, . . . , 16C) that are within the radio communication range of the RFID system via the reader antenna (18). The reader circuit (19) provides a carrier signal to power the antenna (18) which sends a beam of interrogating electromagnetic wave to the RFID tags (e.g., 16A, 16B, . . . , 16C). Commands to the RFID tags (e.g., 16A, 16B, . . . , 16C) are modulated on the carrier signal.

The RFID tags (e.g., 16A, 16B, . . . , 16C) include their individual tag antennas (e.g., 17A, 17B, . . . , 17C) to receive the interrogating electromagnetic wave, and corresponding RFID circuits (e.g., 15A, 15B, . . . , 15C) to process the commands received from the RFID reader. Based on the commands, the RFID tags (e.g., 16A, 16B, . . . , 16C) can be selectively silenced (e.g., being placed in a mode to reduce interrogating electromagnetic wave backscattered from the tag, or not to actively transmit any signals using its internal power source), or be instructed to produce a response (e.g., via backscattering or actively transmitting).

In one embodiment, the RFID system (100) is used not only to identify the RFID tags, but also to determine the parameters of the RFID tags, related to the motion relative to the reader antenna (18), and thus the corresponding motion parameters of physical objects that are tagged by the corresponding RFID tags (not shown in FIG. 1). For example, the reader can be used to determine a distance between an RFID tag (e.g., 16A, or 16B, or 16C) and the reader antenna (18), a relative speed, acceleration or jerk between the tag and the reader.

In one embodiment, one of the RFID tags is instructed to be responsive to the RFID reader circuit (19) while other RFID tags are silenced (or being out of range). For example, the interrogation signal from the reader circuit (19) is received by the tag antenna (17A) and passed to the RFID circuit (15A) for processing. If the interrogation signal triggers a response, the RFID circuit (15A) uses its tag antenna (17A) to send to the reader circuit (19) a response, such as tag identification information or other data stored in the memory of the tag (16A).

The reader circuit (19) passes the data obtained from the RF ID tags to the data processing system (21), which performs any suitable function. For example, based on the data received from the RFID tags (e.g., 16A, 16B, . . . , 16C), the data processing system (21) may allow access to a building or parking garage, note the entrance of an employee to a work location, direct a parcel identified by the RFID tag down a particular conveyor system, or conduct inventory of products in a shopping cart for purposes of checkout and payment.

In one embodiment, the reader circuit (19) and/or the data processing system (21) also determine various parameters that characterize the motion of the RFID tags, such as the position, velocity, acceleration, jerk, etc., using the response signal from the RFID tag.

When there is a movement relative to each other between an RFID tag and the reader circuit, the response signal from the RFID tag has a Doppler frequency shift that is proportional to the relative speed of motion.

In one embodiment, the Doppler frequency shift in the response signal is determined to compute the speed of motion. Acceleration can then be determined based on a time derivative of the speed; and jerk can be determined based on a time derivative of the acceleration. The distance of the tag from the reader antenna can be estimated based on a known position of the tag at a particular time instance and a time integration of the speed of the tag as monitored by the reader.

In one embodiment, multiple antennas are used to detect the Doppler effect relative to the different antenna locations. The projection of the speed in different directions, as determined from the Doppler effect detected at different locations, can also be used to determine a position or a vector (e.g., magnitude and direction) of any other kinematical parameter of the RFID tag.

In one embodiment, antenna signals generated at multiple antennas are combined to improve the detection of Doppler, such as by noise reduction techniques. For example, the signals received by multiple antennas at different locations can be combined to detect the Doppler effect in the radio frequency signals transmitted from an active RFID tag.

In one embodiment, the RFID tag is instructed to provide a response via modulating the amplitude of the backscattered interrogating electromagnetic wave, or remaining at a high backscattering state (e.g., in a backscattering mode), while other RFID tags are silenced (e.g., remaining at a low backscattering state or by entering a non-communicative state) or out of the interrogation range. When an RFID tag is silenced, the interrogating electromagnetic wave backscattered from the silenced RFID tag is negligible; and thus the silenced RFID tag is not considered in a backscattering mode.

In one embodiment, the RFID reader combines the received signal that represents the electromagnetic wave backscattered from the selected RFID tag and the signal representing the interrogating electromagnetic wave that is being transmitted by the reader to determine the Doppler frequency shift and thus the speed of relative line-of-sight motion between the tag antenna and the reader antenna.

Since the RFID tags can be selectively placed in the backscattering (reflecting) mode, the reader can obtain the backscattered interrogating electromagnetic wave from the selected RFID tag without having to aim the beam of the electromagnetic wave at the RFID tag to avoid other RFID tag.

Figure 2:
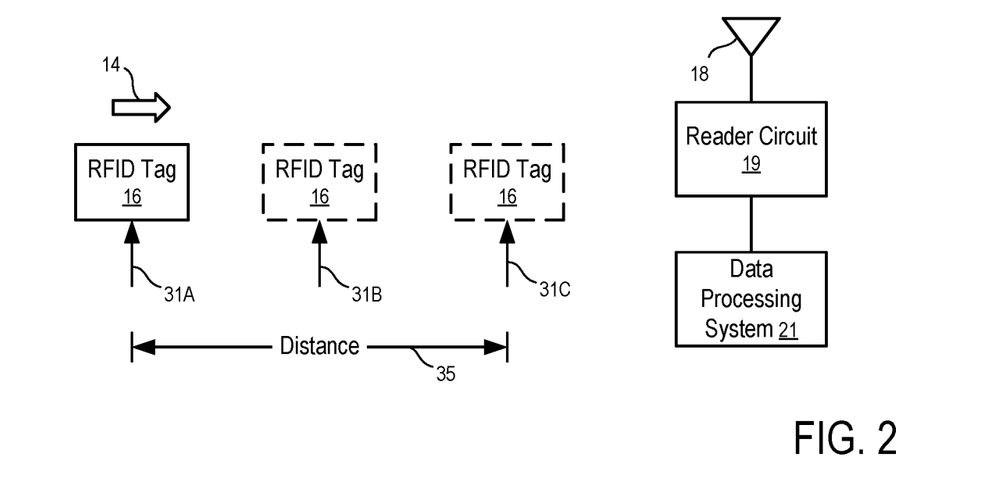
FIG. 2 shows an RFID system configured to determine motion parameters using an RFID tag according to one embodiment.

FIG. 2 shows an RFID system configured to determine motion parameters using an RFID tag according to one embodiment. In FIG. 2, the reader circuit (19) is configured to provide a carrier signal to power the antenna (18) to transmit an interrogation signal to the RFID tag (16). A reader circuit (19) is also configured to receive the response signals from a tag. The reader circuit (19) combines the transmitted carrier signal and the response signals to determine a frequency offset to determine a speed (14) of the tag moving relative to the reader circuit (19).

In FIG. 2, the reader circuit (19) uses the same antenna (18) to transmit and to receive. In alternative embodiments, separate antennas are used to transmit the carrier signal and to receive the signals from the RFID tag (16).

The transmitted carrier signal and the response signal can be combined in a number of ways to determine the frequency difference between the transmitted carrier signal and the response signal. For example, the transmitted carrier signal and the response signal can be summed in analog form to create a combined signal that is indicative of frequency difference. Alternately, the transmitted carrier signal and the response signal can be mixed (multiplied) in analog form to create the combined signal.

In one embodiment, the transmitted carrier signal and the response signal are normalized before they are combined to avoid combining signals that have peak amplitude substantially different from each other.

In one embodiment, the frequency-shifted carrier signal in the response backscattered from the RFID is recovered via modulation removal (e.g., to remove the data encoded on the carrier signal via amplitude modulation) and combined with the carrier signal of the reader to determine the frequency shift.

Alternatively, transmitted carrier signal and the response signal can be digitized into a binary waveform and combined via exclusive OR (XOR) operation to generate a signal that is indicative of the frequency difference between the transmitted carrier signal and the response signal. For example, counting the transition in combined signals over a period of time can be used to determine the frequency difference between the transmitted carrier signal and the response signal.

In FIG. 2, the RFID tag (16) moves in a substantially constant speed towards the reader antenna (18) through positions (31A, 31B, 31C). Alternatively, the reader antenna (18) may move toward the tag. If both the RFID tag (16) and the reader antenna (18) are moving relative to each other, the Doppler effect is based on the relative velocity between them. Due to the Doppler effect, there is a frequency shift in the signals the reader antenna (18) receives from the RFID tag (16).

Figure 3:
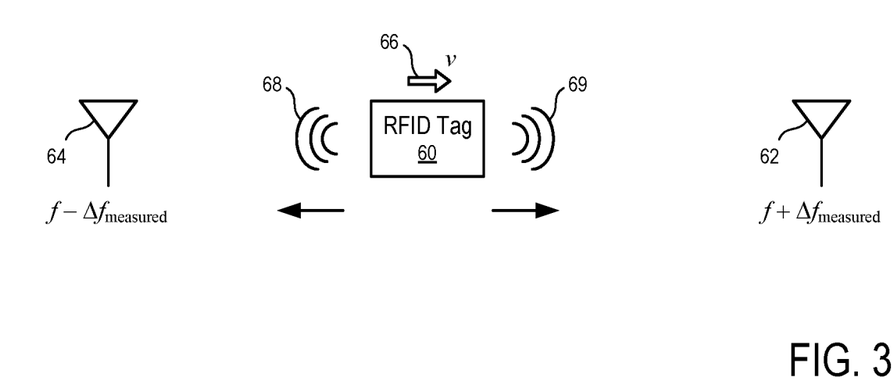
FIG. 3 shows a method to detect Doppler effect according to one embodiment.

FIG. 3 shows a method to detect Doppler shift according to one embodiment. In FIG. 3, the RFID tag (60) moves at a speed v (66) relative to the antennas (62 and 64). The antennas (62 and 64) may be connected to a same reader circuit or different reader circuits. The radio frequency signal reflected from a passive or semi-active RFID tag has a frequency $f+/-\Delta f_{measured}$. The interrogating electromagnetic wave may be transmitted from one of the receiving antennas (62 and 64), or from a separate antenna (not shown in FIG. 3). The radio frequency signal may be generated using an oscillator of the RFID tag (e.g., when the RFID tag is an active tag), in which case the RFID tag frequency source has a frequency $f_{oscillator}$ and the frequency received at antennas (64 and 62) are $f-\Delta f_{oscillator}$ and $f+\Delta f_{oscillator}$, respectively.

In FIG. 3, since the RFID tag (60) is moving at a speed v (66) towards the antenna (62), the electromagnetic wave (69) received at the antenna (62) has a frequency $f+\Delta f_{measured}$. In one embodiment, $\Delta f_{measured}$ is frequency shift in the reflected signal received at the antenna (62) relative to the signal transmitted from the antenna (62), which is the total Doppler frequency shift observed at the antenna (62).

In the scenario of a passive tag (or a semi-passive tag) reflecting the signal, however, the original frequency source ("train whistle") is not on the tag ("train"), rather it is by the reader's side; and the tag is reflecting an echo back to the reader antenna. So, there are two equal Doppler frequency shifts of interest in the passive tag or semi-passive tag scenarios: one received by the moving tag, which becomes the frequency source of the moving tag's "whistle", and a second equal frequency shift detected at the receiver ("listener") next to the transmitter of the reader. Thus, the total shift of frequency in the passive tag or semi-passive tag scenarios is twice that of the Doppler shift in classic scenarios taught for the train whistle example. The total Doppler frequency shift $\Delta f_{measured}$ is measured at the reader antenna. So, the classical Doppler frequency shift is $\Delta f_{reader} = \frac{1}{2} \Delta f_{measured}$. Since the classic Doppler frequency shift is $\Delta f_{reader} = f \times v/c$, where c is the speed of light, the speed v (66) can be determined as $v = c \times \frac{1}{2} \Delta f_{measured}/f$, based on the total Doppler frequency shift $\Delta f_{measured}$ observed at the antenna (62).

In FIG. 3, since the RFID tag (60) is moving at a speed v (66) away from the antenna (64), the electromagnetic wave (68) received at the antenna (64) has a frequency $f-\Delta f_{measured}$. In one embodiment, $\Delta f_{measured}$ is frequency shift in the reflected signal received at the antenna (64) relative to the signal transmitted from the antenna (64), which represents the Doppler frequency shift observed at the antennas (64). Since the total Doppler frequency shift has been doubled by the signal reflection scenario, the classical Doppler frequency shift is $\Delta f_{reader} = \frac{1}{2} \Delta f_{measured}$. Since the classic Doppler frequency shift is defined as $\Delta f = f \times v/c$, where c is the speed of light, the speed v (66) in the passive or semi-active tag case can be determined as $v = c \times \frac{1}{2} \Delta f_{measured}/f$, based on the total Doppler frequency shift $\Delta f_{measured}$ observed at the antennas (64) and (62).

For example, if the passive or semi-active Doppler frequency shift $\Delta f_{measured}$ is measured to be 6 Hz and frequency f=900 MHz, the speed of the tag (as observed by the antenna) is determined as $v = (3 \times 10^8) \times \frac{1}{2} \times 6/(900 \times 10^6) = 1$ meter/second.

In one embodiment, the Doppler frequency shift $\Delta f_{measured}$ is measured based on comparing the frequencies of the interrogating electromagnetic wave transmitted by the antenna (62) and the interrogating electromagnetic wave backscattered from the RFID tag (60) and received at the antenna (62). The comparison can be performed by combining the interrogating electromagnetic wave transmitted by the antenna (62) and the backscattered interrogating electromagnetic wave, via summing, mixing, or through XOR operations. The combined signal can be filtered to obtain a signal that has a frequency indicative of the frequency difference.

In one embodiment, both antennas (62 and 64) transmit interrogating electromagnetic waves (e.g., via different signal polarization and/or carrier frequency); and the Doppler frequency shift detected by the antennas (62 and 64) can be combined to improve accuracy and reliability. For example, the absolute value of the velocity determined at the antenna (62) can be averaged with the absolute value of the velocity determined at the antenna (64) to suppress variation due to noise. For example, a weighted average of the Doppler frequency shifts detected by the antennas (62 and 64) can be used to determine the speed of the RFID tag. For example, the measurements of the antennas (62 and 64) can be weighted according to received signal strength indicator (RSSI) measured at the antennas (62 and 64).

In another embodiment, the frequency difference in the antenna signals received by the antenna (62) and the antenna (64) is determined to detect the Doppler frequency shift. For example, in FIG. 3, the frequency difference between the wave (68) as observed by the antenna (64) and the wave (69) as observed by the antenna (62) is $2 \times \Delta f_{measured}$. From that, the reader system can combine the signals received from the antennas (64 and 62) to determine the frequency difference and the Doppler. The signals from the RFID tag (60) may be generated from the RFID tag (60) reflecting an interrogating electromagnetic wave (e.g., in passive or semi passive tag scenarios), or generated via an independent oscillator of the RFID tag (60) (e.g., in active tag scenarios).

In some embodiments, the RFID tag is configured to double the frequency in reflection. For example, a diode connected to the tag antenna can be used to cause the RFID tag to reflect the interrogating electromagnetic wave at a carrier frequency double that received by the RFID tag. For example, the diode can be coupled across the arms of a dipole antenna at its feed point to perform double frequency reflection. The double frequency reflection can be used to enhance signal to noise ratio, particularly in reducing interference. Velocity can be determined directly from the measured doubled frequencies and their Doppler shifts, as with the carrier frequency.

In some embodiments, separate interrogating electromagnetic waves can be transmitted by the antennas (62 and 64) or other antennas (not shown in FIG. 3); and the antennas (62 and 64) are designed to receive the separate interrogating electromagnetic waves backscattered from the RFID tag (60). For example, interrogating electromagnetic waves of different polarizations can be reflected by different antennas of the RFID tag (60) to generate the waves (68 and 69) for the antennas (64 and 62) respectively.

In FIG. 3, the antennas (62 and 64) are placed alone the line of motion path of the RFID tag (60). The position of the RFID tag can be determined based on time integration of the speed detected via the antennas (62 and 64) and a known position of the RFID tag (e.g., detected via a mechanical or optical trigger, trigger and/or detected using other methods).

In another embodiment, at least one antenna can be placed outside the line of the motion path of the RFID tag to measure a projection of the motion speed along a line between the RFID tag and the antenna. A measurement of the projected motion speed can be used to determine the location of the RFID tag along the motion path.

In one embodiment, the motion of the tag is limited to a predefined path (e.g., a conveyor system, or a road, etc.). Thus, the relative speed between the tag and the reader can be used to compute the velocity of the tag along the path. Multiple readers, or a reader with multiple antennas, can be used to obtain multiple measurements of the speed of the tag. The measurements can be combined to provide an estimate with improved accuracy (e.g., via a weighted average process).

In one embodiment, the motion of the tag is limited to a plane (e.g., the surface of the earth). Multiple readers and/or a reader with multiple antennas can be used to obtain multiple measurements of the speed of the tag relative to different locations. From the multiple measurements, the position and the velocity of the tag can be estimated.

In some embodiments, the reader determines the direction of the tag relative to the reader antenna, based on the strength of the signal backscattered from the tag. Thus, measurements relative to two or more reader antennas can be used to determine both the position and the velocity of the tag on the surface.

In some embodiments, the reader determines the speed of the tag without determining the direction of the tag relative to the reader antenna. Thus, measurements relative to four or more reader antennas can be used to determine both the position and the velocity of the tag on the surface.

The methods of the disclosure can further be extended to measure the position and velocity of the tag in a three dimensional space.

Figure 4:
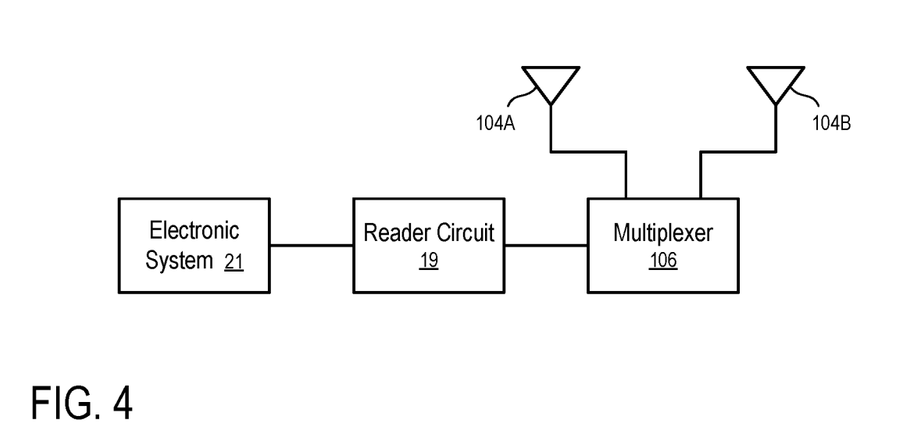
FIG. 4 shows an RFID reader with multiple antennas.

FIG. 4 shows an RFID reader with multiple antennas. In FIG. 4, the reader circuit (19) is connected to multiple antennas (104A and 104B) via a multiplexer (106). The multiplexer (106) connects the reader circuit (19) to the antennas (104A and 104B) one at a time, to allow the reader to interrogate the tags from different locations and thus to measure the speed of the tag relative to the different antenna locations. The measurements obtained from different antenna locations can be used to improve measurement accuracy and/or to determine the position of the tag.

In one embodiment, the multiplexer selectively couples the antennas (104A and 104B) to the reader circuit (19) for transmission and for receiving. For example, the reader system may use the antenna (104A) to transmit an interrogating wave and use the antenna (104B) to receive a wave backscattered from an RFID tag (or to receive a wave transmitted separately by the RFID tag).

In another embodiment, a reader system may use multiple antennas concurrently. For example, the reader system may use an antenna in front of the RFID tag and an antenna at the back of the RFID tag to concurrently receive signals from the RFID tag; and the concurrently received signals can be combined to detect the Doppler and calculate the speed of the RFID tag.

Figure 5:
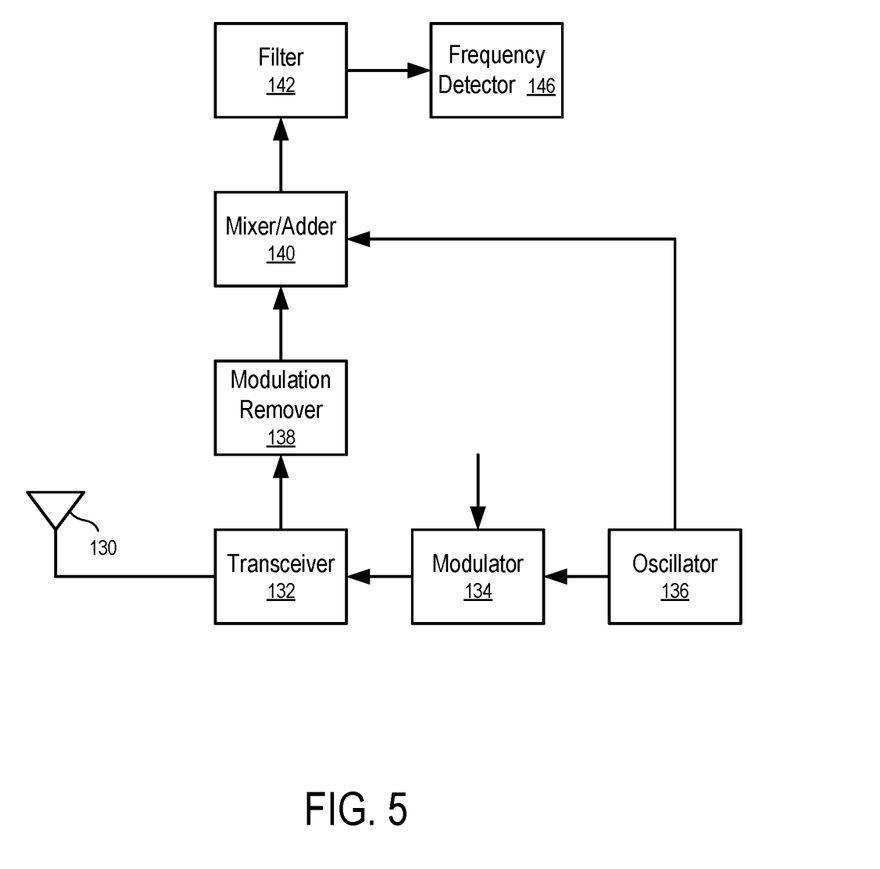
FIG. 5 shows a block diagram of an RFID reader to combine signals in analog form according to one embodiment.

FIG. 5 shows a block diagram of an RFID reader to combine signals in analog form according to one embodiment. In FIG. 5, the reader includes an oscillator (136) to generate a carrier signal for the interrogation of the tags. The modulator (134) coupled to the oscillator to modulate the carrier signal according to the commands to be sent to the tags. The transceiver (132) is coupled to the reader antenna (130) to transmit the carrier signal with or without modulation.

In one embodiment, after the reader transmits the commands, the reader controls the modulator to transmit the carrier signal without modulation. The RFID tags are allowed to modulate the backscattered carrier signal to provide responses.

The transceiver (132) receives the backscattered carrier signal via the antenna (130) (or a different antenna not shown in FIG. 5). The signals modulated on the backscattered carrier signal can be used to determine the identity of the tag (e.g., using a circuitry not shown in FIG. 5). The modulation remover (138) removes amplitude modulation on the backscattered carrier signal and thus normalizes the backscattered carrier signal. The mixer or adder (140) is used to generate an analog signal that is representative of the phase/frequency difference between the backscattered carrier signal and the carrier signal generated by the oscillator (136).

In FIG. 5, the filter (142) removes the carrier signal from the output of the mixer or adder (140) to generate a signal for the frequency detector (146). The frequency detector (146) determines the frequency of the signal received from the filter (142). Since the determined frequency is indicative of the Doppler frequency shift, the determined frequency can be used to compute the speed of the RFID tag.

In one embodiment, to determine the speed of tag, the reader provides a command to the selected tag to cause the tag in a high reflective state without modulating the backscattered carrier signal. The modulation remover (138) is thus reduced to a signal normalizer.

In an alternative embodiment, the signal generated from the modulation remover (138) is combined by the mixer/adder (140) with a separately received signal (e.g., a signal received from the RFID tag via a separate antenna) to detect Doppler.

Figure 6:
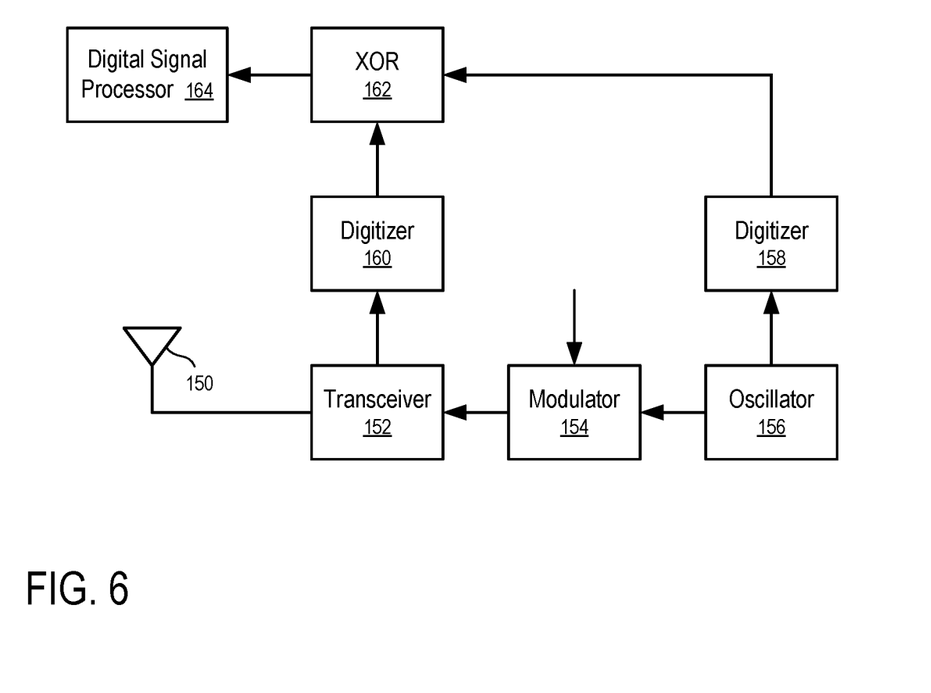
FIG. 6 shows a block diagram of an RFID reader to combine signals in digital form according to one embodiment.

FIG. 6 shows a block diagram of an RFID reader to combine signals in digital form according to one embodiment. In FIG. 6, the reader includes an oscillator (156) to generate a carrier signal for the interrogation of the tags. The modulator (154) coupled to the oscillator to modulate the carrier signal according to the commands to be sent to the tags. The transceiver (152) is coupled to the reader antenna (150) to transmit the carrier signal with or without modulation.

The transceiver (152) receives the backscattered carrier signal via the antenna (150) (or a different antenna not shown in FIG. 6). The signals modulated on the backscattered carrier signal can be used to determine the identity of the tag (e.g., using a circuitry not shown in FIG. 6). The digitizers (158 and 160) convert the analog carrier signals to digital signals. The logic XOR unit (162) performs exclusive OR on the digitized signals. The digital signal processor (164) detects the transitions in the output of the logic XOR unit (162) to determine the frequency difference between the backscattered carrier signal and the carrier signal generated by the oscillator (156) and to determine the speed of the tag.

In some embodiments, the speed of an active tag can also be determined through detecting the frequency shift in the carrier signals transmitted by the active tag. For example, the active tag can be calibrated to have the same carrier frequency as the reader (or other frequencies with a known relation relative to the frequency of the oscillator of the reader).

Alternatively, signals with different Doppler shifts can be combined to detect the Doppler. For example, the signal generated from the digitizer (160) is combined by the XOR module (162) with a separately received and digitized signal (e.g., a signal received from the RFID tag via a separate antenna) to detect the Doppler frequency shift.

In some of the embodiments, an RFID tag responds to the interrogating electromagnetic wave with a tag identification value, or data held in the tag memory. In these embodiments, determining the parameters for relative motion between the RFID tag and the reading antenna is based on periods of time during which the RFID tag is reflective. However, in some situations the periods of time when the RFID tag is reflective as part of communicating data may be insufficient to determine the frequency shift (e.g., the data rate is too high and the reflective period is therefore too short). Thus, in other embodiments, an RFID tag is placed into a reflective mode such that, for an extended period of time relative to selective backscattering to send data, the RFID tag is in a purely reflective mode. The reader circuit and/or electronic system in these embodiments are configured to send a command instructing the RFID tag to change its operation to a constant or alternating repetitive state; hence, the electromagnetic waves received at the reading antenna are only backscattered electromagnetic wave without any associated data. The RFID tag is configured to time out of the reflective state, or the command sent to the place the tag in the reflective state, may include a period of time for the RFID tag to stay reflective, and then revert to prior operational modes. Thus, by setting the RFID tag to a reflective state determining of the speed of the tag relative to the reader system can occur for a longer period of time, or occur more rapidly.

Figure 7:
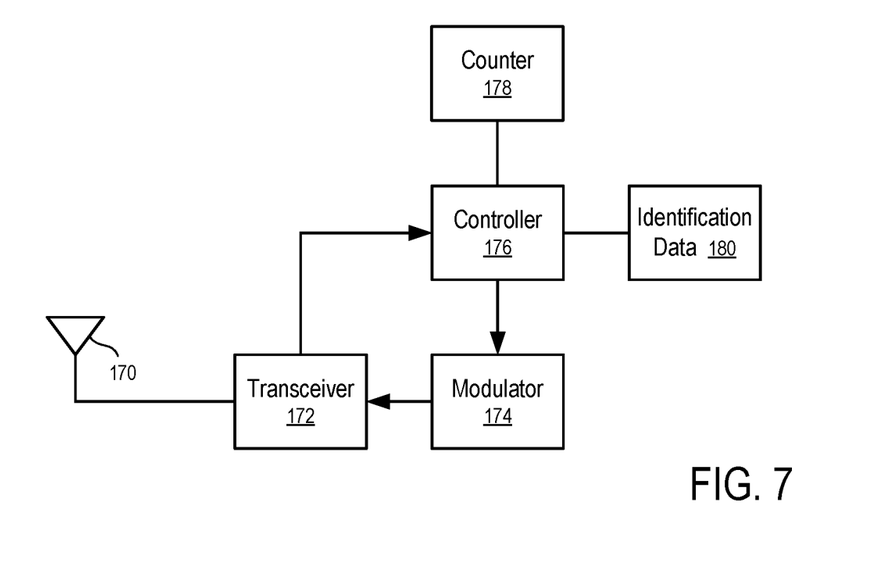
FIG. 7 shows a block diagram of an RFID tag according to one embodiment.

FIG. 7 shows a block diagram of an RFID tag according to one embodiment. In FIG. 8, the tag includes a tag antenna (170), a transceiver (172), a modulator (174), a memory for tag identification data (180), a controller (176) and a counter (178). The transceiver (172), modulator (174), memory for tag identification data (180), controller (176) and counter (178) can be implemented on an Integrated Circuit (IC) chip.

In FIG. 7, when the transceiver (172) receives a command to read the identification data (180), the controller (176) can modulate the carrier signal by switching the tag between a high backscattering mode and a low backscattering mode. When the controller (176) receives a command to measure the speed of the tag, the controller (176) causes the modulator (174) to set the tag in the high backscattering mode for a period of time. The counter (178) is used to determine the expiration of the high back scattering mode.

In one embodiment, the command includes a specification of the duration of the time period for the measurement of the speed of the tag. The controller (176) sets the counter (178) according to the time duration specified in the command received from the reader.

Alternatively, the RFID tag may not include a counter (178). When the tag is placed in the high backscattering mode for speed measurement, the controller (176) monitors the interrogating electromagnetic wave to detect a subsequent command. When the reader transmits a subsequent command, or when the interrogating electromagnetic wave is temporarily interrupted, the controller (176) switches off the high backscattering mode.

In another embodiment, the tag is an active tag that has its own oscillator (not show in FIG. 7). When the tag receives a command for the speed measurement, the tag is to transmit the carrier signal without data modulation, for a predetermined period of time, or upon receiving a subsequent command from the reader.

In one embodiment, the transceiver (172) includes a diode coupled to the antenna (170) to double the frequency in reflection. For example, the diode can be coupled across the dipole arms of a dipole antenna at the feed point to perform doubled frequency reflection.

Figure 8:
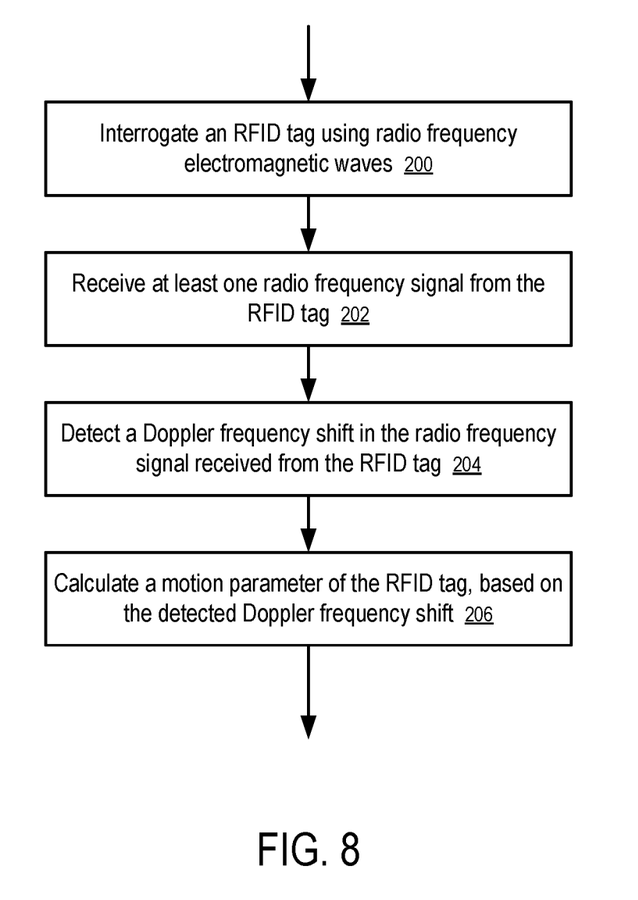
FIG. 8 shows a method implemented in an RFID system according to one embodiment.

FIG. 8 shows a method implemented in an RFID system according to one embodiment. In FIG. 8, an RFID reader interrogates (200) an RFID tag using radio frequency electromagnetic waves and receives (202) at least one radio frequency signal from the RFID tag. After a Doppler frequency shift is detected (204) in the radio frequency signal received from the RFID tag, a motion parameter of the RFID tag (e.g., position, speed, acceleration or jerk) is calculated (206) based on the detected Doppler frequency shift.

In one embodiment, a first signal is received at a first antenna and a second signal at a second antenna; and a frequency difference between the first signal and the second signal is determined to detect the Doppler frequency shift.

In one embodiment, the RFID tag transmits a radio frequency electromagnetic wave independent of electromagnetic waves from the RFID reader; and the radio frequency electromagnetic wave independently transmitted by the RFID tag is received as the first signal at the first antenna and the second signal at the second antenna.

In one embodiment, the RFID tag reflects an interrogating electromagnetic wave from the first antenna to provide the first signal and reflecting an interrogating electromagnetic wave from the second antenna to provide the second signal. The first antenna may transmit the interrogating electromagnetic wave in one polarization; and the second antenna may transmit the interrogating electromagnetic wave in a different polarization.

In one embodiment, in response to a command from the RFID reader, the RFID tag reflects a radio frequency electromagnetic wave transmitted from the RFID reader to generate a backscattered wave which is received as the first signal at the first antenna and the second signal at the second antenna.

In one embodiment, the radio frequency signal is received from the RFID tag in response to the RFID reader interrogating a plurality of RFID tags, including the RFID tag. For example, the RFID reader may communicate with the plurality of RFID tags that are present in the communication range to silent the plurality of RFID tags, except the RFID tag, to receive the radio frequency signal.

In one embodiment, to receive the radio frequency signal from the RFID tag, the RFID reader maintains transmission of an interrogating electromagnetic wave for a period of time; the RFID tag operates in a mode of increased backscatter of the interrogating electromagnetic wave; and the RFID reader receiving the interrogating electromagnetic wave backscattered from the RFID tag.

In one embodiment, to determine the motion parameter of the RFID tag, the interrogating electromagnetic wave transmitted by the RFID reader and the interrogating electromagnetic wave backscattered from the RFID tag are combined to generate a combined signal; and a frequency of the combined signal is determined to detect the Doppler frequency shift. The interrogating electromagnetic wave transmitted by the RFID reader and the interrogating electromagnetic wave backscattered from the RFID tag can be combined via summing the interrogating electromagnetic wave transmitted by the RFID reader and the interrogating electromagnetic wave backscattered from the RFID tag, mixing the interrogating electromagnetic wave transmitted by the RFID reader and the interrogating electromagnetic wave backscattered from the RFID tag, or determining exclusive OR between the interrogating electromagnetic wave transmitted by the RFID reader and the interrogating electromagnetic wave backscattered from the RFID tag.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus, comprising:
   a modulator configured to generate a first signal modulated according to first data in the apparatus;
   a transceiver coupled to the modulator to transmit the first data via first radio frequency signals transmitted through an antenna according to the first signal;
   a circuit coupled to the transceiver to generate a second signal based on second radio frequency signals received via the transceiver through the antenna; and
   a controller configured to determine:
      an identity of a device based on second data modulated on the second radio frequency signals received in the transceiver, and
      at least one motion parameter of the device based on a frequency of the second signal, wherein the frequency of the second signal is indicative of a frequency shift between the first radio frequency signals and the second radio frequency signals resulting from the device reflecting the first radio frequency signals.

2. The apparatus of claim 1, wherein the at least one motion parameter comprises a position, a speed, an acceleration, or a jerk, or any combination thereof.

3. The apparatus of claim 1, wherein the circuit is configured to determine a Doppler frequency shift between the second signal generated by the circuit and a fourth signal generated in the apparatus; and the motion parameter is determined based at least in part on the Doppler frequency shift.

4. The apparatus of claim 3, wherein the circuit is configured to generate the second signal from removal of modulations from the second radio frequency signals received in the transceiver.

5. The apparatus of claim 4, wherein the first data comprises a command configured to request the device to reflect signals.

6. The apparatus of claim 5, wherein the second data comprises an identification stored in the device.

7. The apparatus of claim 6, wherein the second radio frequency signals include signals reflected by the device with the modulations according to the identification stored in the device.

8. The apparatus of claim 7, wherein the signals reflected by the device are transmitted by the apparatus via the antenna.

9. A method, comprising:
   generating, by a modulator of an apparatus, a first signal modulated according to first data in the apparatus;
   transmitting, by a transceiver coupled to the modulator in the apparatus, the first data via first radio frequency signals transmitted through an antenna according to the first signal;
   generating, by a circuit coupled to the transceiver in the apparatus, a second signal based on second radio frequency signals received via the transceiver through the antenna; and
   determining, by the apparatus:
      an identity of a device based on second data modulated on the second radio frequency signals received in the transceiver, and
      a speed of the device based on a frequency of the second signal.

10. The method of claim 9, further comprising:
    determine a Doppler frequency shift between the second signal generated by the circuit and a fourth signal generated in the apparatus, wherein the speed is determined based at least in part on the Doppler frequency shift.

11. The method of claim 10, wherein the second signal is generated from removal of modulations from the second radio frequency signals received in the transceiver.

12. The method of claim 11, wherein the first data comprises a command configured to request the device to reflect signals.

13. The method of claim 12, wherein the second data comprises an identification stored in the device.

14. The method of claim 13, wherein the second radio frequency signals include signals reflected by the device with the modulations according to the identification stored in the device.

15. The method of claim 14, wherein the signals reflected by the device are from the antenna of the apparatus.

16. A system, comprising:
    a device configured to receive commands via radio frequency signals and to provide identification data of the device in response to the commands; and
    an apparatus, comprising:
       a modulator configured to generate a first signal modulated according to a command;

a transceiver coupled to the modulator to transmit the command via first radio frequency signals transmitted through an antenna according to the first signal;

a circuit coupled to the transceiver to generate a second signal based on second radio frequency signals received via the transceiver through the antenna; and a controller configured to:
   determine the identification data of the device based on modulations on the second radio frequency signals received in the transceiver, and
   determine at least one motion parameter of the device based on a frequency of the second signal indicative of a frequency shift between the first radio frequency signals and the second radio frequency signals resulting from the device reflecting the first radio frequency signals.

17. The system of claim 16, wherein the at least one motion parameter comprises a position, a speed, an acceleration, or a jerk, or any combination thereof; the circuit comprises a detector configured to determine a Doppler frequency shift between the second signal generated by the circuit and a fourth signal generated in the apparatus; and the motion parameter is determined based at least in part on the Doppler frequency shift.

18. The system of claim 17, wherein the circuit is configured to generate the second signal from removal of modulations from the second radio frequency signals received in the transceiver.

19. The system of claim 18, wherein the second radio frequency signals include signals reflected by the device and modulated according to the identification data of the device.

* * * * *